May 29, 1951　　　J. R. LONG ET AL　　　2,554,534
CONTROL DEVICE

Filed June 15, 1946　　　　　　　　2 Sheets-Sheet 1

INVENTORS
John Robert Long
Emerson L. Stroh

BY Nicholas Senger
ATTORNEY

May 29, 1951    J. R. LONG ET AL    2,554,534
CONTROL DEVICE

Filed June 15, 1946    2 Sheets-Sheet 2

INVENTORS
John Robert Long
Emerson L. Strok
BY
Nicholas Lange
ATTORNEY

Patented May 29, 1951

2,554,534

UNITED STATES PATENT OFFICE 2,554,534

CONTROL DEVICE

John R. Long and Emerson L. Stroh, Indianapolis, Ind., assignors to P. R. Mallory & Co., Inc., Indianapolis, Ind., a corporation of Delaware Application June 15, 1946, Serial No. 676,969

14 Claims. (Cl. 200—122)

This invention relates to control devices and, more particularly, to control devices which are adapted to vary the effective current supplied to a resistive heating load.

Heretofore, temperature control of resistive heating loads, such as electric range surface elements, has ordinarily been accomplished by the use of surface elements in the form of multi-section resistors, control of which is effected by a multi-position switch so arranged that it can apply various voltages across the different sections individually or in series, parallel, or series-parallel combinations. A disadvantage of this system of control resides in the fact that the various sections of the surface element are necessarily switched in and out of the circuit by steps so that continuous variation of the current from the minimum to the maximum value is, as a practical matter, impossible to obtain.

It is an object of the invention to improve the construction and operation of control devices and particularly of devices for controlling the effective current supplied to an electrical load circuit.

It is a further object of the invention to provide a control device for cyclically opening and closing an electrical circuit, the relative length of the open and closed circuit periods controlling the effective current supplied to the circuit.

It is a still further object of the invention to obviate the necessity of providing series or shunt resistors in a load circuit in order to regulate the current supplied thereto.

It is a still further object of the invention to provide a control device to vary the effective current supplied to a load circuit by utilizing fluid pressure within a sealed diaphragm chamber to cyclically actuate a plurality of contacts which are connected in the load circuit.

It is a still further object of the invention to provide a control which is inherently free from the effects of ambient temperature variations and in which the necessity of providing an auxiliary temperature compensation device is obviated.

It is a still further object of the invention to provide a control device in which the average current supplied to a resistive heating load may be varied over a wide range but which is simple and economical in construction and reliable in operation.

Other objects of the invention will be apparent from the following description and accompanying drawings taken in connection with the appended claims.

In accordance with the invention, we accomplish the aforementioned objects by utilizing periodic expansion and contraction of a fluid confined within a sealed chamber to actuate a diaphragm which, in turn, opens and closes a set of contacts to cyclically interrupt the current to the load circuit. We accomplish the periodic expansion and contraction of the fluid by providing a resistive heating element within the chamber which is connected in series with the load and the aforementioned set of contacts in such fashion that the contacts are closed and the heating element is energized when the diaphragm is collapsed. When the fluid in the chamber is heated and thereby expanded sufficiently to extend the diaphragm, the contacts are opened, whereupon the heater circuit is broken and the fluid in the chamber commences to cool, this cooling process continuing until the diaphragm is collapsed with resultant closure of the contacts. The contacts are, therefore, cyclically opened and closed to define a plurality of operating cycles, each cycle consisting of a heating period when the resistive element is energized and a cooling period when the heating element is deenergized.

The effective current supplied to the load circuit may be continuously varied, throughout a wide range, by providing auxiliary means for supplying current to the load circuit throughout a portion of each cooling period. The length of this portion may be regulated to thereby vary within wide limits the effective current supplied to the load circuit over a number of operating cycles.

It is a feature of the invention that the average current supplied to the load is substantially independent of ambient temperature variations. This is explicable on the basis that ambient temperature variations change the rate of expansion or contraction of the fluid within the sealed chamber, thus varying the total length of each operating cycle but having substantially no effect upon the ratio between the open circuit and closed circuit portion of each cycle. Since the average current supplied to the load circuit is dependent on the ratio between the open circuit and closed circuit periods and not on the total length of the operating cycle, the effective current remains substantially contant despite large variations in ambient temperature.

Another feature of the invention resides in the fact that the effective load current may be continuously varied over a wide range. Current is supplied to the load throughout the heating period and throughout any desired portion, from 0% to 100%, of the cooling period. It is a characteristic of the diaphragm chamber of the invention that the heating period occupies only a small portion, for example 5%, of the total cycle time with the result that the cooling period takes up the major portion, for example 95%, of the total cycle time. It will be apparent, therefore, that current may be supplied to the load during 5% to 100% of each operating cycle with the result that the effective load current may be varied from 5% to 100% of the maximum load circuit.

The diaphragm chamber of the invention is inherently sealed against dust, dirt, moisture and the like and, in addition, the parts may be of simple rugged construction so that little or no adjustment is required once the control unit has been placed in service.

The invention accordingly comprises the features of construction, combination of elements, arrangement of parts, and method of manufacture referred to above or which will be brought out and exemplified in the disclosure hereinafter set forth, including the illustrations in the drawings, the scope of the invention being indicated in the appended claims.

For a fuller understanding of the nature and objects of the invention as well as for specific fulfillment thereof, reference should be had to the following detailed description taken in connection with the accompanying drawings, in which.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Figure 1:
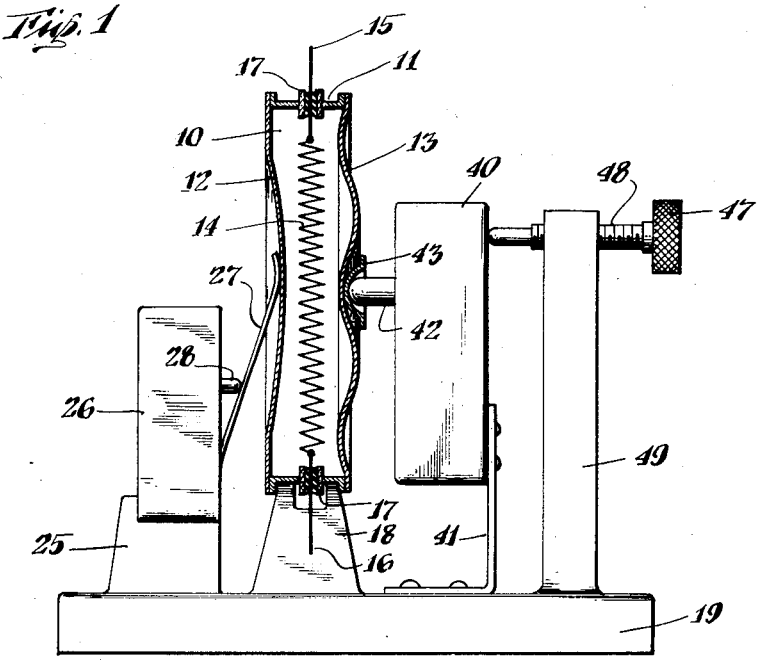
Figure 1 is a sectional view, partially in elevation, of a control device constructed in accordance with the invention.
Figure 2:
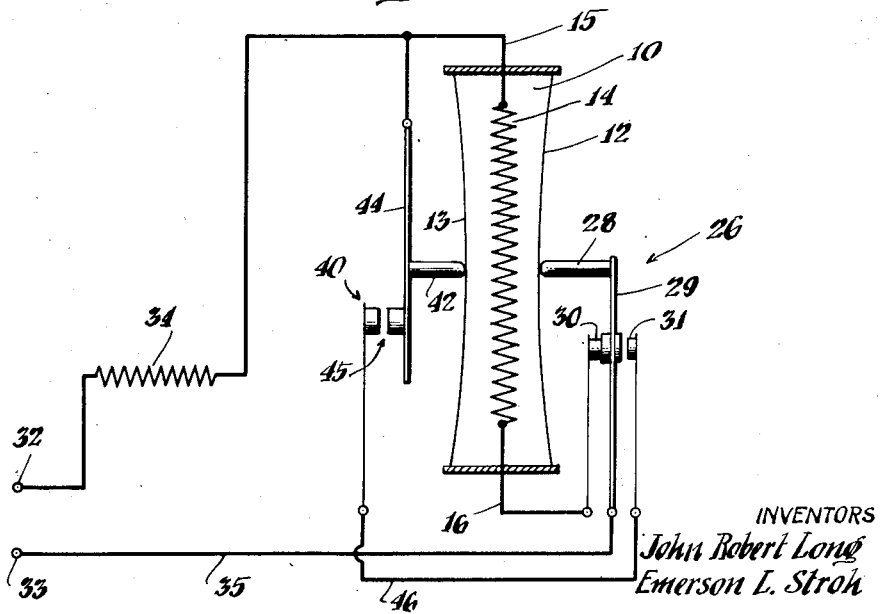
Figure 2 is a schematic circuit diagram disclosing a suitable circuit for use with the apparatus shown in Figure 1.

Referring now to Figures 1 and 2, the novel control device comprises a sealed chamber 10 which is defined by a cylindrical casing 11 and diaphragms 12, 13. The chamber 10 is filled with a suitable heat expansible fluid, such as air, the diaphragms being extended and collapsed as the fluid pressure in the chamber increases and decreases in the manner hereinafter explained. A resistive heating element 14 is disposed within the chamber 10, and this heating element is supported by leads 15, 16 extending, respectively, through seals 17 in the cylindrical casing member 11. The diaphragm chamber may be mounted upon a support 18 which is secured, in any suitable manner, to a base 19.

The base 19 may also carry a support 25 upon which is mounted a snap action switch device 26. A suitable switch for this purpose is a device known in the trade as a "Microswitch." A spring member 27 forming a part of the switch 26 engages the diaphragm 12 and actuates a rod 28 which is secured to a lever or spring 29, Figure 2, disposed within the switch device. The lever 29 controls a set of contacts 30 and a set of contacts 31. When the diaphragm 12 is collapsed, it will be seen that the contacts 30 are closed and the contacts 31 are open. As the diaphragm expands, the lever 29 moves in a clockwise direction, Figure 2, and, when a critical point is reached, the lever 29 moves by snap action to thereby open the contacts 30 and close the contacts 31.

When the contacts 30 are closed, a circuit is completed which includes the terminals 32, 33 of any suitable current source, a load indicated in the drawing by resistor 34, the lead 15, resistive heating element 14, lead 16, contacts 30, lever 29, and a conductor 35. Responsive to the closure of this circuit, current passes through the load 34 and heating element 14, thus heating and expanding the fluid within chamber 10. When the fluid is heated sufficiently to expand the diaphragm 12, the contacts 30 are opened by snap action with the result that the heating element is deenergized. Thereupon, the fluid within the chamber 10 starts to cool and, when the resultant contraction of said fluid is sufficient to cause the collapse of diaphragm 12, the contacts 30 are again closed by snap action and the heating element is once more energized. It will be apparent, therefore, that we have thus far disclosed a control device operated by fluid pressure for cyclically opening and closing the heater and load circuit. In the following description, the term "heating period" shall refer to the portion of each operating cycle during which the heating element 14 is energized and the term "cooling period" shall refer to the portion of each operating cycle during which the heating element 14 is deenergized. It will be apparent that, with the circuit thus far described, the load 34 is energized during the whole of each heating period and deenergized during each cooling period although maximum current is not supplied to the load during the heating period since the heating element is connected in series with the load at that time.

Broadly speaking, our invention resides in the provision of a sealed diaphragm chamber including a resistive heating element in which the diaphragm operates a set of contacts by snap action, these contacts, in turn, controlling the supply of current to the heating element. In order to obtain an energizing period of the proper length, there must be a time lag between the time at which the contacts close to energize the heating element and the time at which the contacts open to break the circuit through the heating element. This necessary time lag may be obtained by utilizing a snap action diaphragm, by using an ordinary diaphragm in connection with an auxiliary snap action switch device or, as shown, by a combination of these two expedients. As illustrated, the diaphragm 12 is a snap action diaphragm which is extended when the pressure in the chamber rises above a predetermined value, at which time the heating element is disconnected and the pressure in the chamber gradually decreases. However, the snap action diaphragm remains extended until the pressure within the chamber falls to a lower critical value, whereupon the diaphragm is collapsed by snap action and the heating element is again energized. The diaphragm then remains collapsed until the pressure again rises to the upper predetermined value.

The same result may be obtained where the diaphragm 12 is of the "breather" type which responds uniformly to changes in pressure, provided that the contacts are actuated by a snap action device such as switch 26. In this case, the diaphragm responds uniformly as the pressure in the chamber rises and falls. However, the construction of the switch is such that the contacts 30 open by snap action at a first critical position of lever 29 and close by snap action at a second critical position of lever 29. The contraction of the diaphragm necessary to move the lever 29 between these two critical positions during the critical period then determines the length of the operating cycle. The closure and opening of the contacts by snap action is, of course, also advantageous in reducing arcing and deterioration of the contact surfaces. Accordingly, by the expression "snap action device" in the appended claims, we refer to any means for opening the contacts 30 at an upper critical pressure within chamber 10 and closing these contacts at a lower critical pressure. This definition specifically includes the use of a snap action diaphragm, the use of a breather diaphragm with a snap action switch device, or the combination of a snap action diaphragm with a snap action switch device.

Another broad and important aspect of this invention relates to the combination with the sealed diaphragm chamber and its included self-cycling resistive heating element with a device for varying the proportion of time, during each operating cycle, in which current is supplied to the load circuit. Although a novel and expedient means for accomplishing this variation in effective load current will be disclosed hereinafter, it is to be understood that the invention is not to be restricted to the particular form shown but is intended to broadly cover the use of any means for varying the effective load current during the operating cycles of the novel sealed diaphragm chamber already described.

As previously stated, the load circuit is completed, during the heating period, through the resistive heating element 14 by closure of the contacts 30. In accordance with the invention, we also close the external load circuit during a portion of each cooling period in the manner now to be explained. We also provide means for varying the proportion of time the load circuit is energized during each cooling period from 0% to 100%. That is to say, the load circuit is energized throughout the entire heating period and, according to the adjustment of the control device, throughout 0% to 100% of the cooling period. To this end, a snap action switch device or "Microswitch" 40, Figure 1, is provided which is secured to a bracket 41 of spring material fixed on the base 19. The contacts of switch 40 are controlled by a rod 42 which has, at one end thereof, a cap 43 engaging the breather diaphragm 13. The other end of the rod 42 is fixed to a lever 44, Figure 2, which is pivotally mounted within the switch 40. A set of contacts 45 is actuated by lever 44 and one of the contacts 45 is connected by a conductor 46 to one of the contacts 31. Accordingly, when the contacts 31 and 45 are closed, the load circuit is completed through terminals 32 and 33, load 34, lever 44, contacts 45, conductor 46, contacts 31, lever 29, and conductor 35. When this circuit is closed, the load is supplied with full current from the source 32, 33 and the heating element 14 is not connected in circuit.

The operation of the control device is as follows:

Assuming that both diaphragms are collapsed, the contacts 30 are closed and contacts 31 are open with the result that current passes through the load and heating element 14 thus initiating the heating period of the operating cycle. During the heating period, the diaphragm 13 expands gradually thus moving lever 44 in a clockwise direction, Figure 2. When the critical point is reached in the movement of lever 44, the contacts 45 are closed by snap action. The pressure in the chamber continues to rise until the upper predetermined pressure limit is reached, at which time diaphragm 12 is extended by snap action, thus opening contacts 30 and closing contacts 31. Thereupon, the cooling period starts and full current is supplied to the load through the contacts 45 and 31, the heating element being disconnected from the circuit. As the fluid within chamber 10 commences to cool, the diaphragm 13 gradually contracts and, when rod 42 is moved to the critical point, the contacts 45 open by snap action. Thereupon, the load circuit is broken and no further current is supplied thereto during the remainder of the operating cycle. When the lower predetermined pressure limit is reached, the diaphragm 12 is collapsed, thus opening contacts 31 and closing contacts 30 with the result that a new operating cycle is initiated.

In order to vary the proportion of the cooling period during which the load circuit is energized, a control knob 47 is provided for effecting relative movement between the switch 40 and the diaphragm chamber. The knob is mounted on a threaded shaft 48 which is screw-threaded in a bracket 49 fixed, in any suitable manner, to the base 19. The free end of the shaft 48 bears against the switch device 40 and it will be apparent that the switch 40 may be pivoted toward and away from the diaphragm 13 by adjustment of the control knob. It will be evident that such pivotal motion of the switch 40 will control the interval elapsing between the start of the cooling period and the opening of contacts 45 and, accordingly, the proportion of each cooling period during which the load circuit is closed.

In order to adjust the control device for delivering maximum effective load current, the switch 40 is pivoted by control knob 47 to move lever 44 to its closest position with respect to diaphragm 13. At this position of the lever 44, the inward motion of the diaphragm 13 during the cooling period is insufficient to operate switch 40 and separate the contacts 45. Accordingly, full load current flows throughout substantially 100% of each cooling period and the maximum effective current is passed through the load. In order to adjust the control device for delivering minimum effective load current, knob 47 is adjusted to move lever 44 to its most remote position relative to diaphragm 13. In this position, the maximum outward movement of diaphragm 13 at the end of the heating period is insufficient to operate switch 40 and close contacts 45. Consequently, the load circuit is deenergized throughout the whole cooling period and minimum effective current is delivered to the load. With the particular circuit shown, the load is, of course, connected in series with the heating element during the heating period of each operating cycle and the current flow through the load during this interval determines the minimum effective current to which the control device may be adjusted. By using a sufficiently large heating resistor, the control device may be constructed so that the heating period takes up as little as 5% of the total cycle time. Consequently, at the minimum setting of the control knob, the load circuit will be energized for only 5% of each operating cycle. Therefore, the effective current delivered to the load may be continuously varied, by adjustment of the control knob, from 5% to substantially 100% of the maximum load current.

Figure 5:
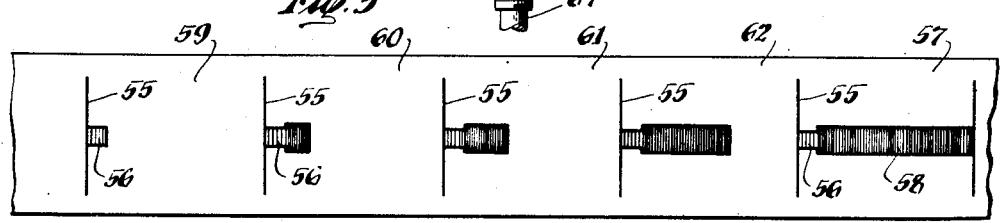
Figure 5 is a view of a tape recording illustrating a feature of the invention.

In Figure 5, a tape recording is shown illustrating the operation of the control device, the abscissa of the curve representing time and the ordinate representing the total current supplied to the load. The distance between adjacent lines 55 represents the length of one operating cycle, the narrow bands 56 represent the respective heating periods, and the remainder of each cycle denotes the length of the cooling period. The operating cycle 57 illustrates the operation of the device when control knob 47 is adjusted so that maximum effective current is delivered to the load. During the heating period 56, reduced current is supplied to the load due to the fact that heating element 14 is connected in series therewith, this condition being indicated by the fact that the band 56 is of reduced width. During the entire cooling period, full current is supplied to the load through contacts 31 and 45 as indicated by the wide band 58. It will be apparent, therefore, that the load receives substantially 100% of the maximum effective current during operating cycle 57. The operating cycle 59 indicates the operation of the circuit when control knob 47 is adjusted so that minimum effective current is delivered to the load. In this case, the load circuit is only energized during the heating period 56 during which the current is reduced since the heating element 14 is connected in series with the load. At such a setting of the control knob, as little as 5% of the maximum effective current may flow in the load circuit. Operating cycles 60, 61, and 62 represent intermediate settings of the control knob 47 and show the variation in the energization of the load circuit as lever 44 is moved toward diaphragm 13. From the foregoing discussion, it will be seen that the effective current supplied to the load over a number of operating cycles may be varied within wide limits.

It will be noted that variations in ambient temperature may vary the rate of change in pressure of the fluid within chamber 10 and hence the total length of the operating cycles but such variations are ineffective to change the proportion of time that the load circuit is energized during each operating cycle since this proportion is dependent only on the position of the control knob 47. Accordingly, over a plurality of operating cycles, the effective current supplied to the load is substantially independent of ambient temperature variations. The novel sealed diaphragm chamber is inherently protected against dust or moisture and the parts outside the chamber may be of simple construction and readily adapted to be sealed against atmospheric conditions or dirt. Moreover, the whole unit may be of simple and durable construction with resultant increase in the reliability and stability of operation.

Figure 3:
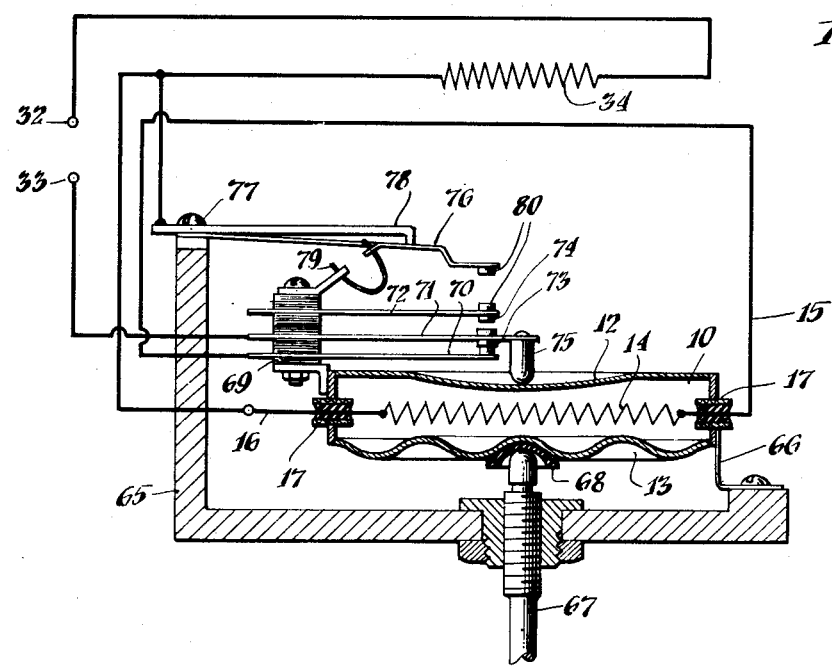
Figure 3 is a sectional view of a modified form of the control device embodying a suitable circuit for use therewith.
Figure 4:
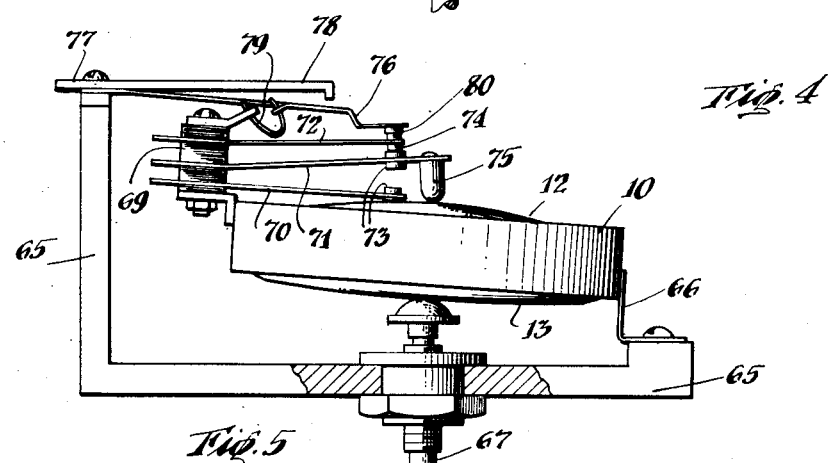
Figure 4 is a front elevational view of the modified control device shown in Figure 3.

A modified form of control device is shown in Figures 3 and 4. Since the construction and operation of the modified unit is similar, in many respects, to the control device already described, corresponding parts will be indicated by like reference characters. It will be seen that an L-shaped base 65 is provided and the parts defining the chamber 10 are pivoted thereto by a bracket of spring material 66. A control shaft 67 is journaled in the base and one end thereof is provided with a cap 68 which bears directly against the breather diaphragm 13 while the other end is adapted to receive a suitable control knob. A stack 69 is secured to the chamber 10 and carries contact strips 70, 71, and 72 which are insulated from each other and carry, at their free ends, sets of contacts 73 and 74 corresponding, respectively, to the sets of contacts 30 and 31 of Figure 2. The contact strip 71 has a rod 75 attached thereto which bears against the snap action diaphragm 12. A contact arm 76 is pivoted on the base at 77 and, with the chamber in the position shown in Figure 3, the contact arm bears against a stop 78 secured, in any suitable manner, to the base 65. A snap action spring member 79 is connected between the stack 69 and contact arm 76 so that, when the chamber 10 is pivoted toward stop 78, a set of contacts 80 mounted, respectively, on contact strip 72 and contact arm 76 are closed by snap action when a critical point of operation is reached.

The operation of the modified control device is generally similar to the operation of the device shown in Figures 1 and 2. At the beginning of the operating cycle, the heating element 14 is connected in series with the load 34 and current source 32, 33 by closure of the contacts 73. When the pressure rises to the upper predetermined limit, the diaphragm 12 expands by snap action forcing contact strip 71 to move away from the diaphragm, thus disconnecting contacts 73 to thereby deenergize the heater element 14 and close the contacts 74. At this time, the chamber 10 is in the position shown in Figure 4 responsive to the flexing of breather diaphragm 13 so that the contacts 80 are closed to establish the load circuit through the current source 32 and 33, load 34, contacts 80, and contacts 74. As the fluid within the chamber 10 commences to cool, the chamber is pivoted in a counterclockwise direction, Figure 3, by the gradual collapse of diaphragm 13 thus moving the stack 69 away from the stop 78. When the critical point is reached, the contacts 80 are opened by the snap action spring 79, thus breaking the load circuit. The adjustment of control rod 67 controls the initial position of the chamber 10 with respect to the stop 78 and, as a result, controls the time at which the contacts 80 are broken to open the load circuit. Accordingly, adjustment of the control rod is effective to vary the effective current supplied to the load circuit. It will be apparent that the same advantages are achieved with the circuit of Figures 3 and 4 as are achieved with the circuit of Figures 1 and 2. The modified circuit has the additional advantage that the snap action switch devices are eliminated and control of the contacts is accomplished by the snap action spring 79.

While the present invention, as to its objects and advantages, has been described herein as carried out in specific embodiments thereof, it is not desired to be limited thereby but it is intented to cover the invention broadly within the spirit and scope of the appended claims.

What is claimed as new and desired to be secured by Letters Patent is:

1. In a control device, a sealed fluid-filled chamber including a snap action diaphragm, a resistive heating element disposed within said chamber and adapted to expand the fluid therein, a set of contacts for controlling said heating element, said contacts being periodically actuated by said diaphragm whereby said heating element is cyclically energized and deenergized, means for closing an external circuit during the period when said heating element is deenergized, and means for varying the length of said closed circuit period.

2. In a control device for varying the effective current supplied to an external circuit connected to a load, a sealed chamber containing a heat expansible fluid, a snap action diaphragm forming a part of said chamber, a resistive heating element adapted to expand said fluid to thereby operate said diaphragm, said element being in series with said load and adapted to be electrically shorted out by said external circuit means controlled by said diaphragm for periodically energizing and deenergizing said heating element to establish an operating cycle, means to close the external circuit when the heating element is energized and also during an additional portion of each operating cycle, and means for varying the length of said additional portion to thereby control the effective current supplied to said external circuit.

3. In a control device, a sealed fluid-filled chamber, a movable member having a snap action forming a part of said chamber, a heating element passing through said chamber for expanding the fluid within said chamber to thereby flex said member, a set of contacts adapted to be actuated by said member and connected in circuit with said heating element, said element adapted to be cyclically electrically shorted out thereby, and means for closing said contacts by snap action when the pressure in the chamber falls to a predetermined value to thereby energize said heating element and for opening said contacts by snap action when the pressure rises to a higher predetermined value to thereby deenergize said heating element.

4. In a control device, a load circuit, a snap action diaphragm and a breather diaphragm, means cooperating with said diaphragms to define a sealed chamber, heat expansible means for applying pressure to the interior of said chamber, a heating element disposed within said chamber, first and second sets of contacts actuated by said snap action diaphragm, said first set being connected in series with said heating element and said load circuit when the snap action diaphragm is collapsed to thereby effect cyclical energization and deenergization of said heating element, and a set of adjustable contacts actuated by said breather diaphragm to complete said load circuit through said second set of contacts when the snap action diaphragm is extended.

5. In a control device, a load circuit, a snap action diaphragm and a breather diaphragm, means cooperating with said diaphragms to define a sealed chamber, heat expansible means for applying pressure to the interior of said chamber, a heating element disposed within said chamber, a set of contacts actuated by said snap action diaphragm and connected in circuit with said heating element and said load circuit whereby said heating element is cyclically energized and deenergized, and a set of adjustable contacts actuated by said breather diaphragm to control the portion of each cycle during which the load circuit is closed.

6. In a control device for varying the average current supplied to a resistive heating load, an external circuit, a sealed chamber containing a heat expansible fluid, a snap action diaphragm and a breather diaphragm forming a part of said chamber, a resistive heating element disposed within said chamber and adapted to expand said fluid to thereby operate said diaphragms, means controlled by said snap action diaphragm for periodically energizing and deenergizing said heating element to establish an operating cycle, means to close an external circuit during a portion of each operating cycle, means operated by said breather diaphragm to open said external circuit during the remainder of each operating cycle, and means for varying the relative length of the open circuit and closed circuit periods of said operating cycles.

7. In a control device for varying the effective current supplied to a resistive heating load, a load circuit, a sealed chamber having an appreciable interior vapor pressure, a snap action diaphragm and a breather diaphragm forming a part of said chamber, a resistive heating element disposed within said chamber and adapted to increase the vapor pressure therein, said snap action diaphragm being extended when the vapor pressure reaches an upper limit, said snap action diaphragm being collapsed when the vapor pressure falls below a lower limit, means for energizing said resistive heating element when the snap action diaphragm is collapsed and deenergizing said heating element when the snap action diaphragm is extended to thereby establish a heating period and a cooling period, means actuated by said breather diaphragm for energizing said load circuit during said heating period and during a portion of said cooling period, said load circuit being deenergized during the remainder of said cooling period, and means for varying the length of time said load circuit is deenergized during the cooling period.

8. In a control device, a sealed chamber containing a heat expansible fluid, said chamber including a snap action diaphragm and a breather diaphragm, a resistive heating element disposed within said chamber and adapted to heat said fluid with resultant flexure of said diaphragms, said snap action diaphragm being extended as the fluid pressure in the chamber reaches an upper limit, said snap action diaphragm being collapsed as the fluid pressure falls below a lower limit, a set of contacts connected in circuit with said heating element and actuated by said snap action diaphragm whereby the heating element is adapted to be cyclically energized and deenergized at a rate affected by the stiffness of said snap action diaphragm and the volume of said chamber, and a set of contacts operated by said breather diaphragm and adapted to control an external circuit, the last-mentioned contacts being actuated at an intermediate pressure between said upper limit and said lower limit.

9. In a control device, a load circuit, a sealed chamber containing a heat expansible fluid, said chamber including a snap action diaphragm and a breather diaphragm, a resistive heating element disposed within said chamber and adapted to expand said fluid, said snap action diaphragm being extended when the fluid pressure in the chamber reaches an upper limit, said snap action diaphragm being collapsed when the fluid pressure falls below a lower limit, means for connecting said heating element in the load circuit when the snap action diaphragm is collapsed and disconnecting said heating element when the snap action diaphragm is extended, and an auxiliary circuit controlled by said breather diaphragm, said auxiliary circuit being operable during the period when the snap action diaphragm is extended to close the load circuit during a portion of said period and to open the load circuit during the remainder of said period.

10. In a control device, a base, a sealed chamber including a snap action diaphragm and a breather diaphragm mounted on said base, a resistive heating element mounted in said chamber, a pair of snap action switch devices adapted for operation by the respective diaphragms, one of said switch devices being fixed on said base, the other of said switch devices being pivotally mounted on said base, and means for effecting pivotal motion of said other switch device.

11. In a control device, a base, a sealed chamber including a snap action diaphragm and a breather diaphragm pivotally mounted on said base, a resistive heating element disposed within said chamber, a first set of contacts secured to said chamber and operable by said snap action diaphragm, a second set of contacts including a contact mounted on said chamber and a contact fixed to said base, a snap action device for opening and closing said second set of contacts, and means for effecting pivotal motion of said chamber to thereby vary the breather diaphragm position at which the second set of contacts is closed.

12. In a control device, a base, a sealed chamber including a breather diaphragm and a snap action diaphragm pivotally mounted on said base, a set of contacts mounted on said chamber and adapted to be operated by said snap action diaphragm, a second set of contacts including a contact mounted on said chamber and a contact fixed on said base, a snap action device for operating the second set of contacts, the expansion of said breather diaphragm being operable to close the second set of contacts at a predetermined position of the chamber, and means for effecting pivotal motion of said chamber to vary the predetermined position at which the second set of contacts is operated.

13. In a control device, a sealed chamber comprising a snap action movable member, a heat expansible fluid in said chamber, a heater in said chamber making direct contact with said fluid for expanding said fluid thereby to move said member, a snap action device responsive to the expansion and contraction of said fluid to periodically energize said heater and thereby effect cyclic movement of said member, an actuator responsive to the cyclic movement of said member for energizing a controlled device during a portion of each cycle, and an adjusting device interacting with said actuator to vary the proportion of each cycle during which the controlled device is energized.

14. In a control device, a sealed chamber comprising a movable snap action member, a heat expansible fluid in said chamber, a heating element in said chamber in direct heat transfer relation with said fluid, means for effecting periodic energization of said heating element thereby to cause cyclic movement of said member, a switch device actuated by said member which is adapted, during each cycle, to energize a load in an external circuit, said load being in series with said heating element, and an adjusting device interacting with said switch device to vary the proportion of each cycle during which the load circuit is energized.

JOHN R. LONG.
EMERSON L. STROH.

REFERENCES CITED

The following references are of record in the file of this patent:

UNITED STATES PATENTS

| Number | Name | Date |
|---|---|---|
| 777,046 | Robertson | Dec. 6, 1904 |
| 1,102,566 | Besley | July 7, 1914 |
| 1,205,434 | Connell | Nov. 21, 1916 |
| 1,492,450 | Gregory | Apr. 29, 1924 |
| 1,523,096 | Zeigler | Jan. 13, 1925 |
| 1,819,588 | Bennett | Aug. 18, 1931 |
| 1,927,934 | Ford | Sept. 26, 1933 |
| 2,060,836 | Taxner | Nov. 17, 1936 |
| 2,172,189 | Clark | Sept. 5, 1939 |
| 2,275,917 | Newell | Mar. 10, 1942 |
| 2,285,677 | Meyers | June 9, 1942 |
| 2,425,030 | Clark | Aug. 5, 1947 |